Figure 1:
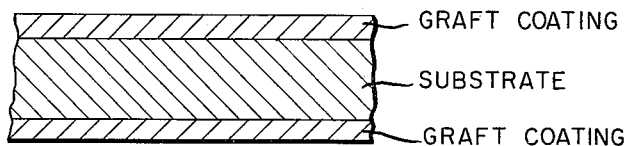

Sept. 12, 1961 R. E. BURK ET AL 2,999,772
COATED ARTICLE COMPRISING A SUBSTRATE OF
POLYETHYLENE OR POLYAMIDE AND A GRAFTED
COATING OF POLYTETRAFLUOROETHYLENE OR
POLYMETHYL METHACRYLATE
Filed Nov. 6, 1952

INVENTORS
ROBERT E. BURK
EDWARD H. PRICE

BY
ATTORNEY

United States Patent Office 2,999,772
Patented Sept. 12, 1961

2,999,772
COATED ARTICLE COMPRISING A SUBSTRATE OF POLYETHYLENE OR POLYAMIDE AND A GRAFTED COATING OF POLYTETRAFLUORO-ETHYLENE OR POLYMETHYL METHACRY-LATE
Robert E. Burk and Edward H. Price, West Chester, Pa., assignors to E. I. du Pont de Nemours and Company, Wilmington, Del., a corporation of Delaware
Filed Nov. 6, 1952, Ser. No. 319,184
2 Claims. (Cl. 117—138.8)

This invention relates to a process for chemically attaching one polymeric substance to another. More specifically, this invention relates to a process for grafting polymeric materials such as polymethyl methacrylate, polytetrafluoroethylene, etc. onto a different polymeric material; for example, polyethylene, nylon, etc.

Just as the properties of steel and other alloys have been altered by additions of other substances, so have the characteristics of plastic materials been changed to meet various new uses by the addition of other substances. Thus, in the rubber industry many mixtures of rubber and other polymerizable substances have been made to meet the demands of the public. Copolymerization, interpolymerization, plasticization, stabilization, and the like are some of the means by which the plastic industry has altered the physical and chemical properties of plastic materials.

In the plastic industry, synthetic materials are being discovered, blended, and perfected constantly in order to develop materials which can replace metals, wood, animal and vegetable products, etc. so as to conserve our natural resources, and to produce a satisfactory and economical replacement. Any one polymeric substance may have certain desirable characteristics such as weight, toughness, hardness, tensile strength, and others, but an attempt to obtain two or more of these properties in a single material is often very difficult. As a result, blends of two or more substances may be utilized, but this procedure often has the effect of producing a material carrying over none of the strong characteristics of the ingredients of the blend, but rather a series of characteristics blanketing each other so that no one or two are dominant. For example, a mixture of Compound A having a high tensile strength and Compound B having a high dielectric strength may be blended to produce a material having merely ordinary tensile strength and ordinary dielectric strength.

By means of laminating layers of different materials, each having certain desirable properties, a composite substance may be produced which has many desirable properties. The disadvantage of laminates is the inherent incorporation of an adhesive which may or may not detract from the usefulness of the final composite structure.

It is an object of this invention to alter the characteristics of a plastic material by grafting one polymer to another polymer by means of a process which is capable of attaching one polymeric substance to another without the aid of an adhesive. By this process, it is possible to cover a base material of high physical strength with a material of high dielectric strength and thus produce a composition having both desirable properties in an undiluted form, and without the inclusion of a layer of adhesive material which might break loose or impart other undesirable properties.

It is another object of this invention to provide a process for polymerizing a monomeric material in the presence of a solid polymeric substance, chemically distinct from said monomeric material, in such a fashion that said monomeric material is polymerized and, at the same time, is attached or grafted to said polymeric substance.

It is another object of this invention to alter the surface characteristics of a polymeric substrate by forming surface coating of a different polymer grafted onto the substrate.

Other objects will appear in the detailed description given hereinafter. The following examples are set forth to more adequately describe the process of this invention.

Figure 2:
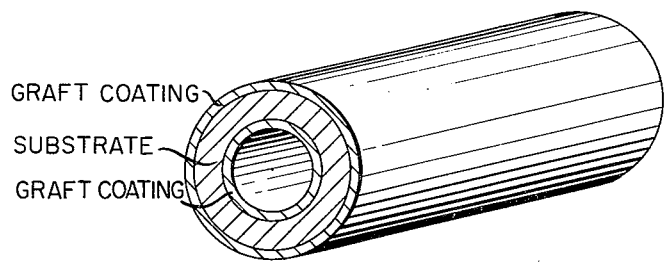
Figure 3:
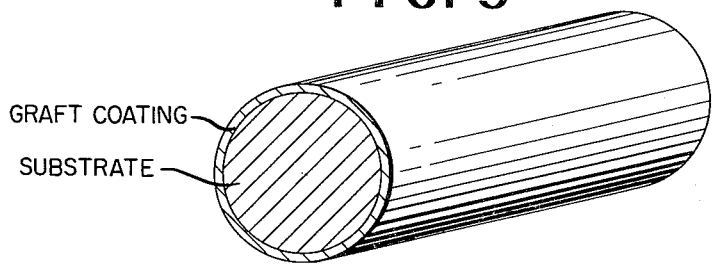

In the attached drawings there are graphic illustrations of certain embodiments of this invention. FIGURE 1 shows a section through a film, sheet, or the like in which the central substrate has been covered on each side with a graft coating. FIGURE 2 shows a tubular article in which the inside and outside surfaces of the tubular substrate have been covered with a graft coating. FIGURE 3 shows a portion of a rod-like structure with the substrate covered with a graft coating.

*Example 1*

A sheet of polyethylene, approximately 4 mils thick, was placed into a stainless steel lined horizontal shaker tube of 325 ml. capacity. There was also introduced into the shaker tube, 1 gram of ammonium perfluorocarboxylate (made from $C_8$ and $C_9$ perfluorocarboxylic acids), 0.02 gram of ammonium persulfate, 200 ml. demineralized water and sufficient tetrafluoroethylene to impart a pressure of 300 p.s.i. inside the tube. The tube was sealed and shaken at a temperature of 78°–80° C. for a period of 54 minutes at continued pressures of about 280–300 p.s.i. Internal pressure of the shaker tube was relieved, the seal broken, and the strip of polyethylene was removed.

Physical examination of the polyethylene strip removed from the shaker tube showed a thin film of polytetrafluoroethylene grafted onto the polyethylene. Approximately 0.5% weight increase was obtained due to the polytetrafluoroethylene. To the naked eye the polyethylene appeared to be frosted, and under a thermal microscope using polarized light the polytetrafluoroethylene was seen to be present as a thin coherent coating. Both surfaces of the polyethylene strip were equally well covered, and there was no evidence of penetration of the polytetrafluoroethylene into the polyethylene.

The same experiment was run using polyethylene tubing. The tubing was coated with a thin layer of polytetrafluoroethylene similar to that found on the film described above. The amount of weight increase of the tubing due to the polytetrafluoroethylene was 0.05%, a smaller value than that found on the film. The difference is due to the lower surface to volume ratio of the heavy walled polyethylene tubing.

*Example 2*

A strip of polyhexamethylene adipamide, 15 mils thick, having a number average molecular weight of 10,000–40,000, was placed in a horizontal platinum-lined shaker tube of 325 capacity. The tube was charged with 200 ml. of water, 0.02 gram of ammonium persulfate and sufficient monomeric tetrafluoroethylene to impart an internal pressure of 300 p.s.i. to the sealed tube at 65° C. The tube was shaken at 65° C. for 15 minutes, and thereafter at 82°–85° C. for 51 minutes, during which time the pressure was maintained at 300 p.s.i. by the addition of tetrafluoroethylene. The polyamide film was coated evenly and firmly with polytetrafluoroethylene. The coating could not be rubbed off with the fingers and it had the waxy feel of polytetrafluoroethylene which is not common to polyamides.

The same experiment was tried on a bar of polyhexamethylene adipamide having a number average molecular weight of 10,000–40,000, measuring 2½ inches by ½ inch by ⅛ inch. The coating obtained on the bar had exactly the same characteristics as described above in relation to the polyamide film.

Example 3

A one-liter resin flask was fitted for evacuation, introduction of monomer, receiving a manometer connection, and receiving a thermometer. A strip of polyethylene, approximately 5 mils thick, was treated with benzoin. The benzoin treatment consisted of evaporating 1 ml. of a 1% solution of benzoin in alcohol on 25 sq. in. of a polyethylene film. This procedure gave a concentration of about 0.4 mg. of benzoin/sq. in. of film surface. A strip of this treated film was suspended from a glass rack placed inside the resin flask, after which, the flask was filled with methyl methacrylate vapors. The pressure was maintained at 50 to 100 mm. and the temperature at 45° to 50° C. The necessary heat was supplied by an infrared lamp directed at the flask. Ultraviolet light was used to promote polymerization of the methyl methacrylate. The ultraviolet light was supplied by two tubular fluorescent-type lights commonly known and sold as BL-360 lights. The flask and its enclosed monomer and the treated film were irradiated for various lengths of times, and thereafter the film was removed from the flask. When the film was folded and creased, neither the polyethylene substrate nor its grafted coating of polymethyl methacrylate cracked or separated from each other in any way.

In a series of experiments conducted as described above, polymethyl methacrylate films of 0.01 to 1.7 mils calculated from weight gain thickness were formed on the strip of polyethylene by ultraviolet irradiation varying from 5 to 200 minutes, respectively, at pressures of methyl methacrylate vapors of 40-60 mm.

In order to show that the polymethyl methacrylate was truly grafted to the polyethylene film, a strip irradiated for 135 minutes to produce a thick polymethyl methacrylate film coating was subjected to a series of solvent extraction treatments consisting of firstly, soaking the coated polyethylene strip overnight in acetone at room temperature, secondly, immersing the strip in refluxing acetone for 6 hours, and lastly, digesting the strip with glacial acetic acid heated to 80° C. on a steam bath. There was only a negligible weight loss recorded after each of the three solvent extraction treatments described above. Furthermore, there was no change in the characteristic polymethyl methacrylate infrared pattern of the coated strip after each of the above-described solvent extraction steps.

It is known that polyethylene films, as well as many other film materials, have certain surface characteristics which prevent adjacent films from sliding over each other easily. This property is commonly known as "slip." If two identical films are laid face to face and can be moved in sliding relationship to each other while maintaining surface contact, the film is said to have good "slip"; and conversely, if the sliding motion is only accomplished with difficulty, and the surfaces seem to stick to each other, the film is said to have poor "slip" characteristics. Obviously, there are some uses of films which require good "slip" and others which require poor "slip." Untreated polyethylene is intermediate in its "slip" characteristics. When subjected to the sliding block test, untreated polyethylene films have slip angles of about 45°. The process of this invention, when used to coat polyethylene with polymethyl methacrylate, produces coated polyethylene films having slip angles of 23° to 27°.

It is not known exactly what is the method of attachment of the grafted coating to the substrate, however, the results show conclusively that there is more than a mere physical coating involved. Solvent extraction does not remove the grafted coating. Films of polyethylene having thereon a coating of polymethyl methacrylate produced according to this invention do not crack when folded and creased. New desirable surface characteristics are produced for the substrate. Thus this invention has produced an entirely new product and process which have wide application in the manufacture of plastic materials.

We claim:
1. A coated article comprising a solid, shaped, thermoplastic, synthetic polymeric substrate and a continuous coating of a thermoplastic, synthetic polymer grafted to said substrate, said article being selected from the group consisting of a polyethylene substrate coated with polytetrafluoroethylene, a polyethylene substrate coated with polymethyl methacrylate, and a polyamide substrate coated with polytetrafluoroethylene; said coated article being characterized in that the coating is incapable of being removed from said substrate when the coated article is subjected to the action of a compound which is a solvent for the material comprising said coating and a nonsolvent for the material comprising said substrate.

2. A coated article comprising a solid, shaped substrate of polyethylene and a continuous coating of polymethyl methacrylate bonded to said substrate in such a fashion that the coating is unaffected by subjecting the coated article to the action of a solvent for polymethyl methacrylate.

References Cited in the file of this patent

UNITED STATES PATENTS

| | | |
|---|---|---|
| 2,028,776 | Hibbert | Jan. 28, 1936 |
| 2,320,533 | Muskat | June 1, 1943 |
| 2,332,461 | Muskat | Oct. 19, 1943 |
| 2,406,454 | Charlton | Aug. 27, 1946 |

OTHER REFERENCES

"Journal of Polymer Science," vol. VIII, No. 3, pages 289–311, March 1952, presented at the International Congress of Pure and Applied Chemistry, New York, September 1951.